(12) United States Patent
Stevenson et al.

(10) Patent No.: US 6,640,414 B2
(45) Date of Patent: Nov. 4, 2003

(54) METHOD FOR ATTACHING METAL MEMBERS

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/055,566

(22) Filed: Jan. 23, 2002

(65) Prior Publication Data

US 2003/0135974 A1 Jul. 24, 2003

(51) Int. Cl.$^7$ .......................... B23P 11/00; B23P 17/00; B23K 20/12
(52) U.S. Cl. ................. 29/525.14; 29/525.01; 29/525.03; 29/525.08; 228/112.1
(58) Field of Search .................... 29/525.01, 525.03, 29/525.08, 525.14, 428; 228/112.1, 139, 114.5, 120; 411/411

(56) References Cited

U.S. PATENT DOCUMENTS

| | | | |
|---|---|---|---|
| 4,850,772 A | 7/1989 | Jenkins | |
| 5,061,135 A | * 10/1991 | Pritchard | 411/411 |
| 5,469,617 A | 11/1995 | Thomas et al. | |
| 5,971,252 A | 10/1999 | Rosen et al. | |
| 5,975,406 A | 11/1999 | Mahoney et al. | |
| 6,053,391 A | 4/2000 | Heideman et al. | |
| 6,138,895 A | 10/2000 | Oelgoetz et al. | |
| 6,206,268 B1 | 3/2001 | Mahoney | |
| 6,213,379 B1 | 4/2001 | Takeshita et al. | |
| 6,227,430 B1 | 5/2001 | Rosen et al. | |
| 6,227,433 B1 | * 5/2001 | Waldron et al. | 228/112.1 |
| 6,264,088 B1 | 7/2001 | Larsson | |

OTHER PUBLICATIONS

Copending U.S. application entitled "A Method for Attaching Metal Members", Ser. No. To Be Assigned, Filed Contemporaneously Herewith (Attorney Docket No. GP–301459).

Copending U.S. application entitled "A Method for Attaching Metal Members", Ser. No. To Be Assigned, Filed Contemporaneously Herewith (Attorney Docket No. GP–301460).

* cited by examiner

*Primary Examiner*—John C. Hong
(74) *Attorney, Agent, or Firm*—Kathryn A. Marra

(57) ABSTRACT

A method of attaching metal members, including placing the metal members in contact with each other and fastening them with a metal fastener having a central axis wherein the metal fastener includes an elongated portion having a substantially constant cross-sectional area at any cross-section taken along a length of the elongated portion perpendicular to the axis of the fastener and includes a topographically varying outer surface. The fastener is driven through the metal sheet and into the metal substrate during rotation of the fastener thereby inducing friction between the fastener, the sheet and the substrate for locally melting the members to form a flowable material that solidifies for attaching the members, the flowable material and the fastener together.

18 Claims, 3 Drawing Sheets

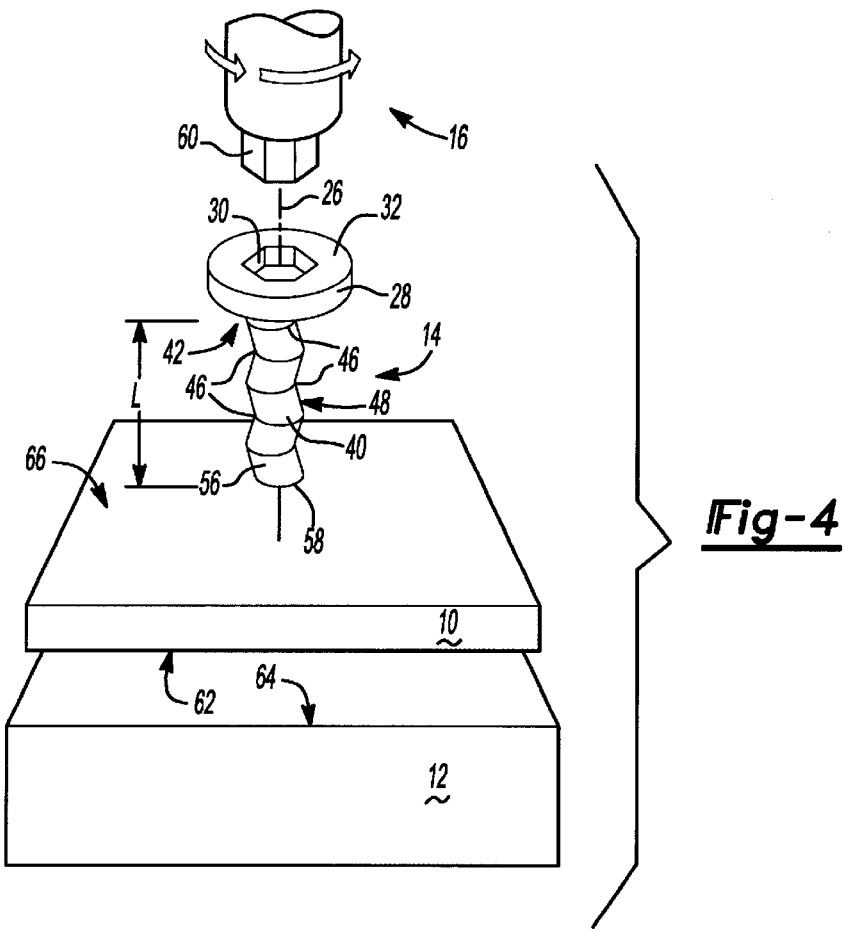
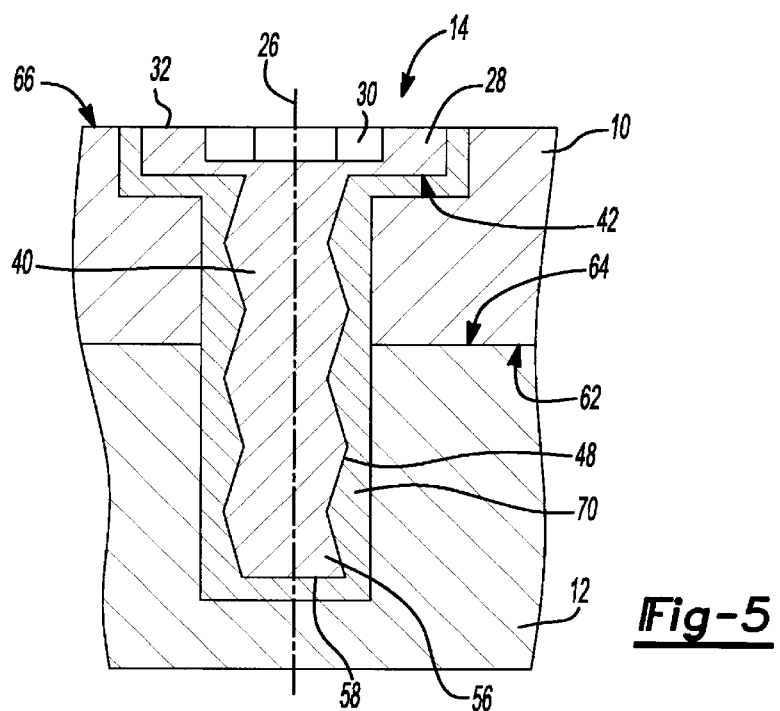

METHOD FOR ATTACHING METAL MEMBERS

TECHNICAL FIELD

The present invention relates to a method and apparatus for attaching metal members for assembling automotive vehicle structures.

BACKGROUND OF THE INVENTION

It is known that the manufacture of automotive vehicles often requires that metal members be attached to each other for forming automotive vehicle structures. Friction stir welding is one potential method of attaching metal members. Conventional friction stir welding typically requires a rotating tool to be translated along an interface between surfaces of metal members for softening or melting portions of the members at the interface. In turn, the softened or melted portions intermix and harden to form metallurgical bonds between the members. During a conventional friction stir welding process, however, substantial amounts of liquidized material may be lost or unused forming weaker bonds. Moreover, a conventional stir welding process may require relatively large amounts of time for forming metallurgical bonds. Thus, there is a need for improved techniques, fasteners or both, alternative to conventional friction stir welding for achieving high integrity attachment of a metal members.

SUMMARY OF THE INVENTION

The present invention meets these needs by providing an improved method for attaching metal members, with particular utility in the formation of components for an automotive vehicle. The method includes placing the metal members in contact with each other and fastening them with a metal fastener having a central axis. The metal fastener includes an elongated portion having a substantially constant cross-sectional area at any cross-section taken along a length of the elongated portion perpendicular to the axis of the fastener. The elongated portion also includes a topographically varying outer surface. The fastener is driven through the metal sheet and into the metal substrate during rotation of the fastener thereby inducing friction between the fastener and the metal members for locally melting the members to form a flowable material that solidifies for attaching the members, the flowable material and the fastener together.

BRIEF DESCRIPTION OF THE DRAWINGS

These and other aspects and advantages of the present invention will become apparent upon reading the following detailed description in combination with the accompanying drawings, in which:

FIGS. 4 and 5 illustrate an apparatus driving the metal fastener of FIG. 1.

DETAILED DESCRIPTION OF THE PREFERRED EMBODIMENT

Figure 1:
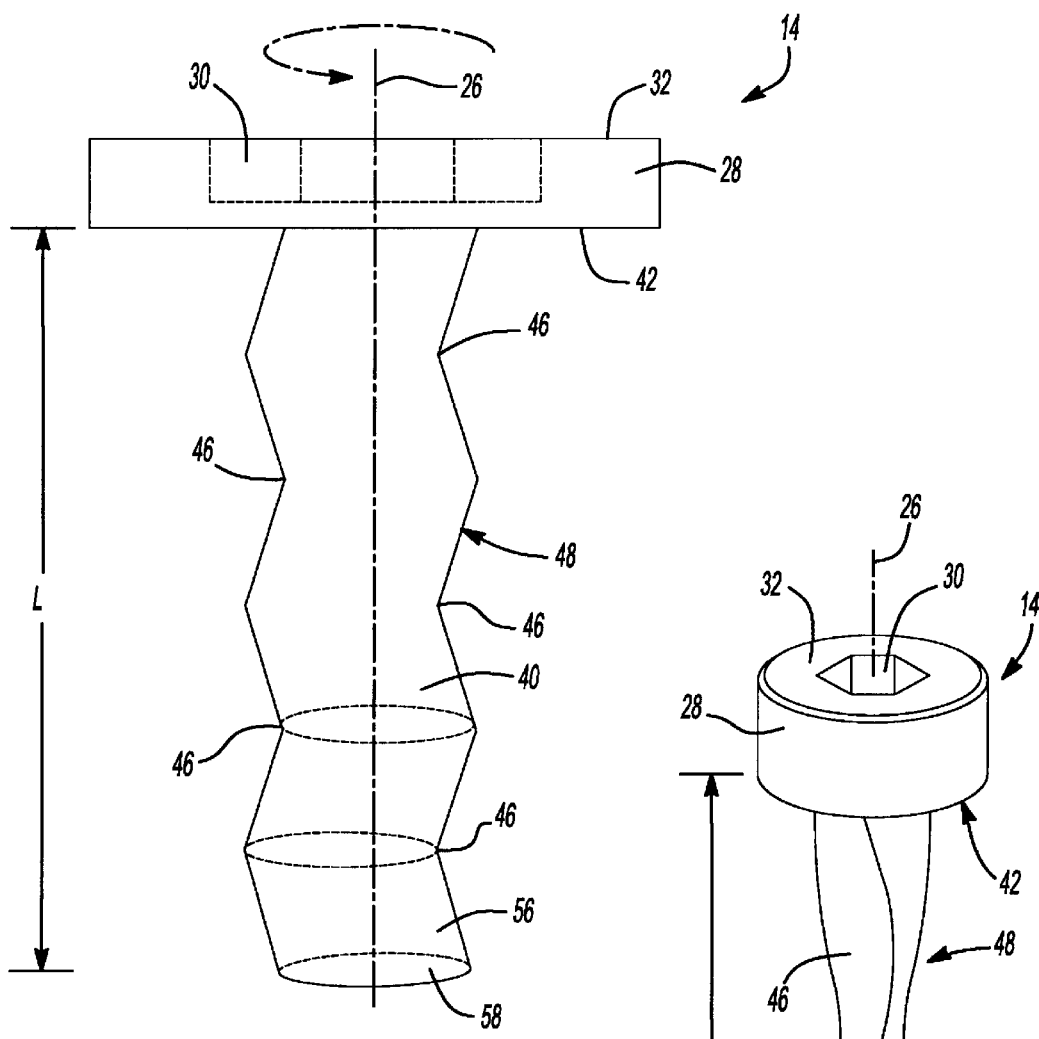
FIG. 1 illustrates a side view of a fastener for attaching metal members.

Referring to FIGS. 1–3B, there are illustrated examples of preferred fasteners for attaching metal members to each other in accordance with the present invention. In general, each of the fasteners is adapted for being driven through a first member and into a second member. Thus, with more specific reference to the illustrated example of FIGS. 4 and 5, a metal sheet 10 is attached to a metal substrate 12 with a fastener 14 that is driven through the sheet 10 and into the substrate 12 by a suitable rotary driving apparatus 16.

Turning again to FIGS. 1 through 3B, each of the fasteners 14 has a central axis 26. Each of the fasteners 14 includes a cylindrical head portion 28 with a cavity 30 formed in a top surface 32 of the head portion 28. The cavity 30 is preferably polygonal or non-circular in shape. Each of the fasteners 14 also includes an elongated shank portion 40 (with length (L)) extending from a bottom surface 42 of the head portion 28. The shank portion may be unthreaded, threaded or partially threaded.

The elongated shank portion 40 of each of the illustrated fasteners 14 has a plurality of inflection sites 46 (e.g. a valley or the like) that define a generally contoured or otherwise topographically varying outer surface 48. In a particularly preferred embodiment, though the cross-section shape may vary along a length (L) of the elongated portion 40, the elongated portion 40 has a substantially constant cross-sectional area at any cross-section taken along the length of the elongated portion 40 and taken perpendicular to the axis 26 of the fastener 14. Each of the elongated portions 40 also includes a leading portion 56 with a leading surface 58. The leading surface 58 may be tapered to a point of flat as shown.

More specifically, as seen in FIG. 1, the elongated portion 40 of the fastener 14 has a substantially zig-zag geometry along its length. Additionally, the elongated portion 40 of the fastener 14 maintains a substantially circular cross-section for any cross-section taken perpendicular to the axis 26 of the fastener 14.

Figure 2:
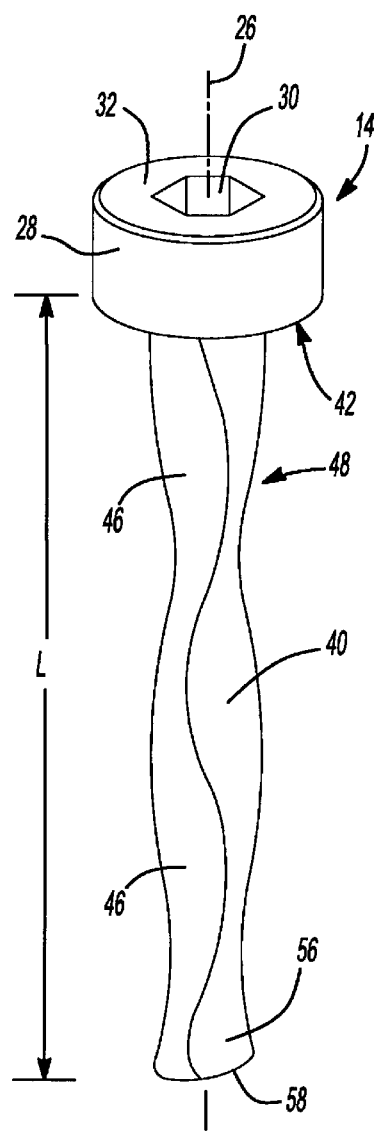
FIG. 2 illustrates a perspective view of an alternative fastener for attaching metal members.

In FIG. 2, the elongated portion 40 of the fastener 14 is generally helical in shape. The portion 40 maintains a substantially elliptical cross-section for any cross-section taken perpendicular to the axis 26 of the fastener 14. Moreover, successive elliptical cross-sections taken at short distances (e.g., 3 millimeters or less) apart along the axis 26 rotate about the central axis 26.

Figure 3A:
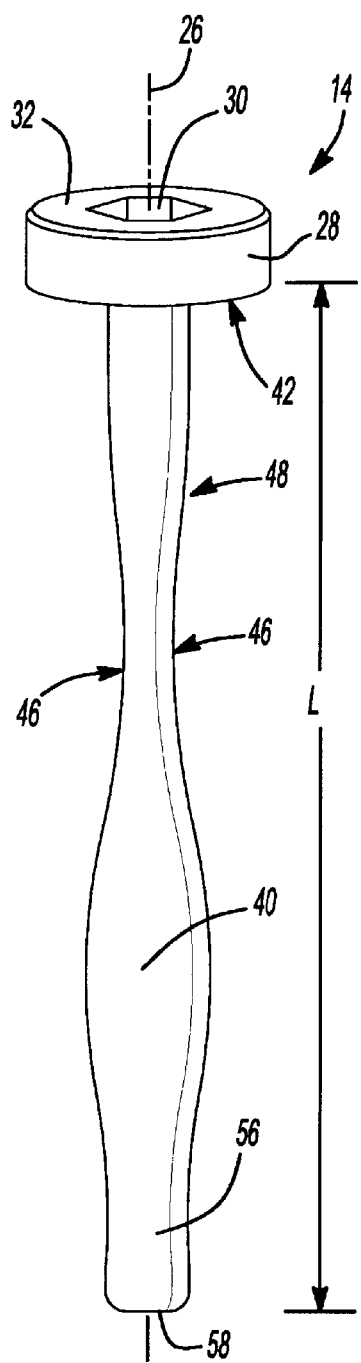
FIG. 3A illustrates a perspective view of another alternative fastener for attaching metal members.
Figure 3B:
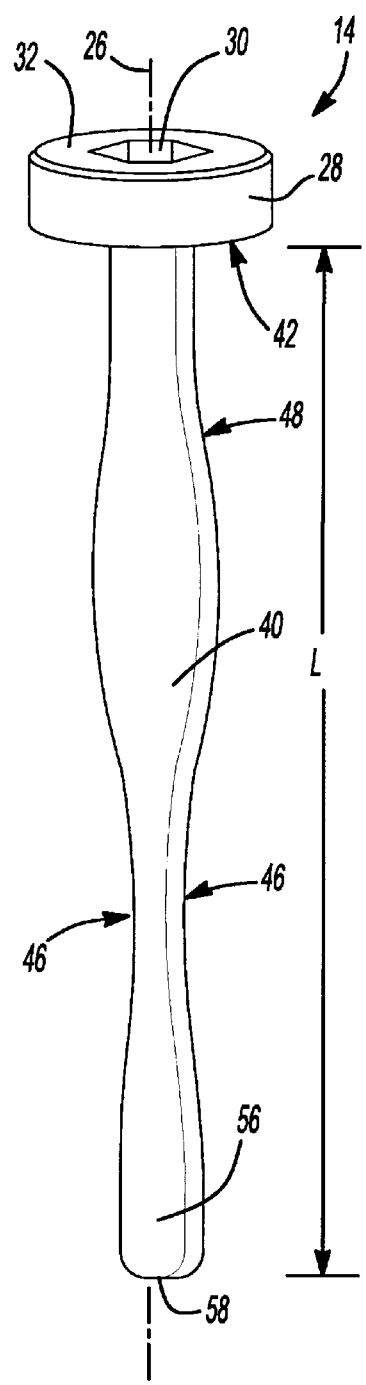
FIG. 3B illustrates a perspective view of the fastener of FIG. 3B rotated 90 degrees about a central axis.

In FIGS. 3A and 3B, the elongated portion 40 of the fastener 14 maintains a substantially constant cross-sectional area for any cross-section taken perpendicular to the axis 26 of the fastener 14 even though the geometry of those cross-sections change. In particular, the successive cross-sections taken at short distances (e.g., 3 millimeters or less) apart along the axis 26 successively change from substantially circular to substantially elliptical.

Preferably, the fasteners 14 of FIGS. 1–5 are formed of a relatively high melting point metal or refractory metal such that the fasteners 14 have a substantially higher melting point than the sheet 10 or substrate 12 (e.g., at least 100° Fahrenheit and more preferably at least 200° Fahrenheit higher). Moreover, the fastener 14 is preferably formed of a metal of substantially greater hardness than the sheet 10 and substrate 12. Exemplary metals include high carbon steel, titanium (e.g., titanium 64) and the like.

Referring to FIGS. 4 and 5, the metal sheet 10 is placed on the substrate 12 with a first surface 62 of the sheet 10 contacting a first surface 64 of the substrate 12 to form a sheet/substrate interface. Additionally, the metal sheet 10 includes a second surface 66 generally opposite the first surface 62 wherein the second surface 66 may remain exposed when the sheet 10 is placed on the substrate 12. Preferably, the sheet 10 is from about 0.3 millimeters thick to about 8 millimeters thick at the location of attachment to the substrate 12. Preferably the substrate is about 4 millimeters thick to about 25 millimeters thick or more at the location of attachment. The sheet 10 and substrate 12 may be formed of metal such as aluminum, magnesium, steel or the like.

The rotary driving apparatus 16 is preferably an automatic or semi-automatic rotation device such as a drill capable of rotating a member 60 extending from the apparatus 16.

In FIGS. 4 and 5, the fastener 14 of FIG. 1 is used for attaching the sheet 10 to the substrate 12. However, the method as described below may be equally applied using any of the fasteners described herein.

For attaching the sheet 10 to the substrate 12, the member 60 is inserted within the cavity 30 of the fastener 14. Preferably, the member 60 has a polygonal or non-circular shape that substantially corresponds to and can be matingly fit within the shape of the cavity 30. Thus, the apparatus 16 can rotate the member 60, which, in turn, rotates the fastener 14 about the central axis 26.

During rotation, the leading surface 58 of the leading portion 56 of the fastener 14 is contacted with the exposed surface 66 of the sheet 10 and the apparatus 16 provides a force for driving the fastener 14 into and through the sheet 10 and then into the substrate 12. As the fastener 14 is driven through the sheet 10 and into the substrate 12, the rotation of the fastener 14 causes the fastener 14 to frictionally contact the sheet 10 and the substrate 12 thereby at least locally melting portions of the sheet 10 and substrate 12. The molten portions intermix to form a flowable material 70 that flows into the plurality of inflection sites 46 of the fastener 14.

Preferably, the fastener 14 is driven into the substrate 12 until the exposed top surface 32 of the fastener 14 is substantially flush with the exposed surface 66 of the sheet 10. Thereafter, the flowable material 70 solidifies within the plurality of inflection sites 46 of the fastener 14 to form the material into a weld to attach the sheet 10, the substrate 12, the flowable material 70 and the fastener 14 together.

Advantageously, the flowable material 70 solidifies to form a metallurgical bond with the sheet 10 and the substrate 12 thereby attaching the sheet 10 to the substrate 12. Moreover, the flowable material 70 solidifies to interference fit or otherwise secure the elongated portion 40 of the fastener 14 in place such that the fastener 14 assists in attaching the sheet 10 to the substrate 12. Also advantageous, the fastener 14 may be driven through the sheet 10 and into the substrate 12 relatively rapidly for attaching the sheet 10 to the substrate 12. As still another added advantage, the substantially uniform cross-sectional areas of the elongated portions 40 of the fasteners 14 allows the fasteners 14 to be driven through the sheet 10 and into the substrate 12 while expelling minimal amounts if any of flowable material 70 onto the exposed surface 66 of the sheet 10.

As can be seen, the fastener 14 is only driven into the substrate 12 without being driven through the substrate 12. It will be appreciated that the present invention provides a method that is particularly useful for blindly attaching a relatively thin metal sheet to a relatively thick substrate where it is either undesirable or unfeasible to form a through-hole in the substrate. Moreover, the present invention provides a method of attaching a sheet to a substrate without having to pre-form holes or cavities in the sheet and substrate.

As can be appreciated, the present invention finds utility in a number of different applications. For example, the metal members (though illustrated as a sheet joined to a substrate) could be any suitable combination of metal parts. Thus, sheet metal, flanges, brackets, trim or the like may be joined to another metal article (e.g., vehicle frame member, vehicle rail member, cast articles, forged articles, or the like). Further, although the present invention has been discussed in terms of metal fasteners, metal sheets and metal substrates, it is contemplated that the fasteners, sheets and substrates may be formed of other materials such as plastic (e.g., thermoplastic).

It should be understood that the invention is not limited to the exact embodiment or construction which has been illustrated and described but that various changes may be made without departing from the spirit and the scope of the invention.

What is claimed is:

1. A method of attaching metal members, comprising the steps of:
    (a) placing the metal members in contact with each other;
    (b) providing a metal fastener having a central axis wherein:
        i) the metal fastener includes an elongated portion extending from a bottom surface of a head portion of the fastener; and
        ii) the elongated portion includes a topographically varying outer surface for forming a plurality of inflection sites along the elongated portion;
    (c) rotating the metal fastener about the axis using a rotary driving apparatus;
    (d) driving the metal fastener through the metal members during rotation of the fastener thereby inducing friction between the fastener and the metal members for locally melting the members to form a flowable material that flows into at least one of the inflection sites of the fastener and wherein the fastener is driven only partially through one of the members; and
    (e) allowing the flowable material to solidify within the plurality of inflection sites for attaching the members, the flowable material and the fastener together wherein:
        i) the metal members are at least partially attached to each other with an interference fit created by the topographically varying outer surface of the elongated portion; and
        ii) the solidified flowable material directly metallurgically bonds the metal members to each other.

2. A method as in claim 1 wherein the elongated portion has a generally helical outer surface.

3. A method as in claim 1 wherein the elongated portion has a zig-zag outer surface topographical variation.

4. A method as in claim 1 wherein cross-sections taken along the length of the elongated portion change from circular to elliptical.

5. A method as in claim 1 wherein the fastener further includes a leading surface for initially contacting an exposed surface of one of the members.

6. A method as in claim 1 wherein the fastener is formed of a material with a higher melting point than the members to be joined.

7. A method as in claim 1 wherein the members to be joined include an aluminum-based sheet metal and an aluminum-based metal casting.

8. A method as in claim 1 wherein the fastener is formed of a refractory metal chosen from the group consisting of high carbon steel and titanium.

9. A method as in claim 1 wherein the elongated portion of the fastener is unthreaded.

10. A method as in claim 9 wherein the elongated portion of the fastener is driven into the members without the assistance of any pre-formed holes.

11. A method of attaching a metal sheet to a metal substrate for forming an automotive vehicle structure, comprising the steps of:
  (a) placing the metal sheet on the metal substrate such that a first surface of the sheet interfaces with a surface of the metal substrate, wherein the metal sheet and metal substrate are adapted for incorporation into an automotive vehicle;
  (b) providing a metal fastener having a central axis wherein:
    i) the metal fastener is formed of a material with a substantially higher melting point than the sheet and the substrate;
    ii) the metal fastener includes a top portion having a cavity formed in a top surface of the top portion;
    iii) the metal fastener includes an elongated portion extending from a bottom surface of the top portion to a flat leading surface, the elongated portion having a substantially constant cross-sectional area at any cross-section taken along a length of the elongated portion perpendicular to the axis of the fastener; and
    iv) the elongated portion is unthreaded and includes a topographically varying outer surface for forming a plurality of inflection sites along the length of the elongated portion;
  (c) rotating the metal fastener about the axis using a rotary driving apparatus that is adapted for temporarily mating engagement within the cavity in the top surface of the top portion of the fastener; and
  (d) driving the metal fastener through the metal sheet and into the metal substrate during rotation of the fastener thereby inducing friction between the fastener, the sheet and the substrate for locally melting portions of the sheet and substrate to form a flowable material that flows into the plurality of inflection sites of the fastener and wherein the fastener is driven only partially through the substrate; and
  (e) allowing the flowable material to solidify for integrally attaching the sheet, the substrate, the flowable material and the fastener together and for attaching the sheet to the substrate with a metallurgical bond.

12. A method as in claim 11 wherein the elongated portion is generally helical in shape.

13. A method as in claim 11 wherein the elongated portion has a zig-zag geometry.

14. A method as in claim 11 wherein the cross-sections taken along the length of the elongated portion change from circular to elliptical.

15. A method as in claim 11 wherein the fastener further includes a leading surface for initially contacting an exposed surface of the sheet.

16. A method as in claim 11 wherein the sheet is aluminum sheet metal and the substrate is an aluminum metal casting.

17. A method as in claim 11 wherein the fastener is formed of a refractory metal chosen from the group consisting of high carbon steel and titanium.

18. A method of attaching a metal sheet to a metal substrate for forming an automotive vehicle structure, comprising the steps of:
  (a) placing the metal sheet on the metal substrate such that a first surface of the sheet interfaces with a surface of the metal substrate, wherein the metal sheet and metal substrate are adapted for incorporation into an automotive vehicle;
  (b) providing a metal fastener having a central axis wherein:
    i) the metal fastener is formed of a material with a substantially higher melting point than the sheet and the substrate;
    ii) the metal fastener includes a top portion having a cavity formed in a top surface of the top portion;
    iii) the metal fastener includes an elongated portion extending from a bottom surface of the top portion to a flat leading surface, the elongated portion having a substantially constant cross-sectional area at any cross-section taken along a length of the elongated portion perpendicular to the axis of the fastener; and
    iv) the elongated portion is unthreaded and includes a topographically varying outer surface for forming a plurality of inflection sites along the length of the elongated portion;
  (c) rotating the metal fastener about the axis using a rotary driving apparatus that is adapted for temporarily mating engagement within the cavity in the top surface of the top portion of the fastener; and
  (d) driving the metal fastener through the metal sheet and into the metal substrate during rotation of the fastener thereby inducing friction between the fastener, the sheet and the substrate for locally melting portions of the sheet and substrate to form a flowable material that flows into the plurality of inflection sites of the fastener and wherein the fastener is driven only partially through the substrate; and
  (e) allowing the flowable material to solidify for integrally attaching the sheet, the substrate, the flowable material and the fastener together and for attaching the sheet to the substrate with a metallurgical bond wherein:
    i) the sheet and the substrate are at least partially attached to each other with an interference fit created by the topographically varying outer surface of the elongated portion; and
    ii) the solidified flowable material directly metallurgically bonds the sheet and the substrate to each other.

* * * * *